(12) United States Patent
Miller et al.

(10) Patent No.: US 9,634,833 B2
(45) Date of Patent: Apr. 25, 2017

(54) GESTURE-BASED PASSWORD ENTRY TO UNLOCK AN ENCRYPTED DEVICE

(71) Applicant: Google Inc., Mountain View, CA (US)

(72) Inventors: James Brooks Miller, Sunnyvale, CA (US); Paul Daniel Lawrence, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 301 days.

(21) Appl. No.: 14/310,187

(22) Filed: Jun. 20, 2014

(65) Prior Publication Data

US 2015/0372810 A1   Dec. 24, 2015

(51) Int. Cl.
| | | |
|---|---|---|
| *G06F 21/00* | (2013.01) | |
| *H04L 9/08* | (2006.01) | |
| *G06F 3/01* | (2006.01) | |
| *G06F 21/60* | (2013.01) | |
| *G06F 21/31* | (2013.01) | |
| *G06F 21/36* | (2013.01) | |
| *G06F 11/30* | (2006.01) | |

(52) U.S. Cl.
CPC ............ *H04L 9/0822* (2013.01); *G06F 3/017* (2013.01); *G06F 21/316* (2013.01); *G06F 21/36* (2013.01); *G06F 21/602* (2013.01); *H04L 9/0863* (2013.01)

(58) Field of Classification Search
CPC ...... G06F 21/602; G06F 3/017; G06F 21/316; G06F 21/36; G06F 21/32; G06F 21/6218; G06F 21/00; G06F 21/604; G06F 21/6245; H04L 9/0822; H04L 2209/24; H04L 9/0863; H04L 63/08; H04L 63/083; H04L 63/105; H04L 63/0428; H04L 63/0861; H04L 63/0876; H04L 63/10; H04L 63/102; H04L 63/18; H04L 63/20
USPC .......................................................... 713/183
See application file for complete search history.

(56) References Cited

U.S. PATENT DOCUMENTS

| | | | | |
|---|---|---|---|---|
| 7,266,699 | B2 * | 9/2007 | Newman | ............. G06F 21/6227 713/182 |
| 8,046,721 | B2 | 10/2011 | Chaudhri et al. | |
| 8,638,939 | B1 * | 1/2014 | Casey | ..................... G06F 21/36 380/277 |
| 2004/0162981 | A1 * | 8/2004 | Wong | .................... H04L 9/3231 713/161 |
| 2005/0097348 | A1 * | 5/2005 | Jakubowski | ........ G06F 21/6209 726/29 |

(Continued)

*Primary Examiner* — Gary Gracia
(74) *Attorney, Agent, or Firm* — Morris & Kamlay LLP

(57) ABSTRACT

Systems and techniques are provided for gesture-based password entry to unlock an encrypted device. A gesture input from a user to a gesture interface may be received. The gesture input may be converted to gesture data which may be hashed using a hashing algorithm to obtain a table key. A table including a master key may be encrypted using the table key. The master key may include a key for decrypting a primary storage that is at least partially encrypted. A second gesture input may be receive. The second gesture input may be an input from a user to the gesture interface. The second gesture input may be converted to second gesture data which may be hashed using the hashing algorithm to obtain a key equivalent to the table key. The table including the master key may be decrypted using the key equivalent to the table key.

11 Claims, 4 Drawing Sheets

(56) References Cited

U.S. PATENT DOCUMENTS

| | | | |
|---|---|---|---|
| 2008/0091833 A1* | 4/2008 | Pizano | G06F 21/6245 709/229 |
| 2009/0287709 A1* | 11/2009 | Kusakabe | G06F 21/6218 |
| 2010/0185843 A1* | 7/2010 | Olarig | G06F 21/6218 713/2 |
| 2010/0199098 A1* | 8/2010 | King | G06F 21/6254 713/182 |
| 2010/0259486 A1* | 10/2010 | Anson | G06F 3/04883 345/173 |
| 2010/0266127 A1* | 10/2010 | Rouse | H04N 21/26613 380/278 |
| 2010/0287382 A1* | 11/2010 | Gyorffy | G06F 21/36 713/185 |
| 2011/0004765 A1* | 1/2011 | Lee | G06F 21/10 713/176 |
| 2011/0032074 A1* | 2/2011 | Novack | G06F 21/32 340/5.53 |
| 2011/0279384 A1* | 11/2011 | Miller | G06F 3/04883 345/173 |
| 2011/0283241 A1* | 11/2011 | Miller | G06F 3/04883 715/863 |
| 2011/0314279 A1* | 12/2011 | Ureche | H04L 9/3228 713/167 |
| 2012/0151219 A1* | 6/2012 | Ryu | H04L 9/0863 713/185 |
| 2012/0212497 A1 | 8/2012 | Kao | |
| 2012/0297205 A1* | 11/2012 | Yuen | G06F 21/31 713/193 |
| 2013/0097697 A1* | 4/2013 | Zhu | G06F 21/36 726/18 |
| 2013/0174094 A1 | 7/2013 | Heo et al. | |
| 2013/0254845 A1* | 9/2013 | Boesgaard | G06F 21/55 726/3 |
| 2014/0096178 A1 | 4/2014 | Shippy et al. | |
| 2014/0101752 A1* | 4/2014 | Hrybyk | G06F 21/31 726/17 |
| 2014/0129847 A1* | 5/2014 | Lee | G06F 21/10 713/193 |
| 2014/0258706 A1* | 9/2014 | Hrybyk | H04L 9/0866 713/150 |
| 2014/0281571 A1* | 9/2014 | Federspiel | G06F 21/6209 713/189 |
| 2014/0373132 A1* | 12/2014 | Basmov | G06F 21/31 726/19 |

* cited by examiner

GESTURE-BASED PASSWORD ENTRY TO UNLOCK AN ENCRYPTED DEVICE

BACKGROUND

A user may encrypt their computing device, such as a laptop, smartphone, or tablet, using full-disk encryption. When a computing device has been encrypted with full-disk encryption, no data stored on the computing device may be accessible without a proper key. This may result in none of the functionality of the computing device being accessible until proper credentials to access the key, such as a password, have been entered into the computing device, as the primary operating system may be encrypted as part of the full-disk encryption.

For mobile computing devices, such as smartphones and tablets, that use full-disk encryption, credential may be passwords or PINS that the user may need to enter into the device. Small real or virtual keyboards on mobile computing devices can make entry of passwords and PINS difficult, as the user may make errors due to accidentally pressing the wrong key, requiring the user to re-enter the password or PIN. Biometric credentials, such as fingerprints, face-recognition, and voiceprints, may be matched based on fuzzy logic, which may make it difficult to map the input for the biometric credentials to the key. Biometric credentials may need to be matched to a version of the biometric credential stored on the computing device, making the computing device less secure.

BRIEF SUMMARY

According to an embodiment of the disclosed subject matter, a gesture input may be received. The gesture input may be an input from a user to a gesture interface. The gesture input may be converted to gesture data. The gesture data may be hashed using a hashing algorithm to obtain a table key. A table including a master key may be encrypted using the table key. The master key may include a key for decrypting a primary storage that is at least partially encrypted. A second gesture input may be receive. The second gesture input may be an input from a user to the gesture interface. The second gesture input may be converted to second gesture data. The second gesture data may be hashed using the hashing algorithm to obtain a key equivalent to the table key. The table including the master key may be decrypted using the key equivalent to the table key. Before hashing the gesture data, the gesture data may be salted with a salt string. Before hashing the second gesture data, the second gesture data may be salted with the salt string.

The table key may be discarded after encrypting the table. The primary storage that is at least partially encrypted may be accessed with the master key. Converting the gesture input to the gesture data may include converting a coordinate touched during the gesture input to a byte string. Converting the gesture input to the gesture data may include matching a symbol drawn in the gesture input and generating a string including the at least one matched symbol. The second gesture data may be the same as the gesture data. The hashing algorithm may be deterministic. The gesture input may be a single continuous motion by the user on the gesture interface.

According to an embodiment of the disclosed subject matter, a means for receiving a gesture input, wherein the gesture input is an input from a user to a gesture interface, a means for converting the gesture input to gesture data, a means for hashing the gesture data using a hashing algorithm to obtain a table key, a means for encrypting a table including a master key using the table key, where the master key may include a key for decrypting a primary storage that is at least partially encrypted, a means for receiving a second gesture input, wherein the second gesture input is an input from a user to the gesture interface, a means for converting the second gesture input to second gesture data, a means for hashing the second gesture data using the hashing algorithm to obtain a key equivalent to the table key, a means for decrypting the table including the master key using the key equivalent to the table key, a means for, before hashing the gesture data, salting the gesture data with a salt string, a means for, before hashing the second gesture data, salting the second gesture data with the salt string, a means for discarding the table key after encrypting the table, a means for accessing with the master key the primary storage that is at least partially encrypted, a means for converting a grid coordinate touched during the gesture input to a byte string, and a means for matching at least one symbol drawn in the gesture input and generating a string including the matched symbol, are included.

A means for receiving a gesture input, wherein the gesture input is an input from a user to a gesture interface, converting the gesture input to gesture data, a means for hashing the gesture data using the hashing algorithm to obtain a key, and a means for attempting to decrypt a table comprising a master key using the key, where the attempt to decrypt the table is successful when the key is equivalent to a table key used to encrypt the table, and where the attempt to decrypt the table is unsuccessful when the key is not equivalent to the table key, are also included.

Systems and techniques disclosed herein may allow for gesture-based password entry to unlock an encrypted device. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
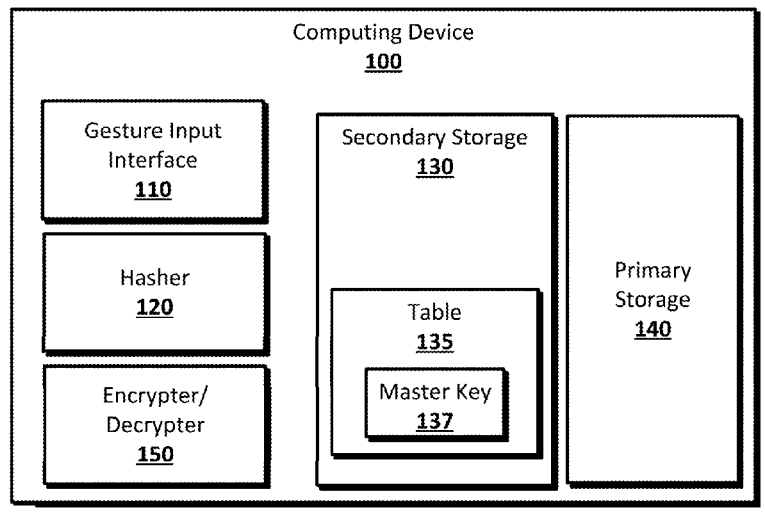
FIG. 1 shows an example system suitable for gesture-based password entry to unlock an encrypted device according to an implementation of the disclosed subject matter.

Gesture-based password entry to unlock an encrypted device may allow for the use of gestures to unlock computing devices that use full-disk encryption. A computing device, such as a laptop, smartphone, or tablet, may include a gesture interface that can receive gesture input, such as a touchscreen or touchpad. The gesture interface may be used to set a gesture-based password for the computing device, for example, when the user first uses the computing device. The gesture-based password input by the user may also be used to secure the computing device using full-disk encryption. The primary storage of the computing device, for example, magnetic hard drive, Solid State Drive, or other non-volatile storage, may by encrypted using a master key and any suitable encryption algorithm. The master key may be stored in table in a secondary storage on the computing device, which may be a separate physical storage device, such as a secure flash memory module, or may be a separate portion of the primary storage, for example, a partition on a hard drive. The table storing the master key may be locked using a key derived from the gestured-based password. To use the computing device subsequently, the user may need to enter the gesture-based password using the gesture interface in order to unlock the table that stores the master key, which may then be used to access the primary storage of the computing device, for example, allowing the operating system of the device to run.

A user may choose to protect a computing device using full-disk encryption. Full-disk encryption may encrypt the entirety of the primary storage of the computing device, including the operating system, installed applications, and user data files, rendering the computing device unusable, and the data on the computing device inaccessible, to anyone who is not able to decrypt the device with the master key. Full-disk encryption may use any suitable encryption algorithm, including, for example, any AES algorithm. The primary storage of the computing device may be any suitable non-volatile memory, including, for example, a magnetic hard drive, a Solid State Drive, other flash memory based drive, or any combination or hybrid thereof. Full-disk encryption may use a master key, which may be an entropy-encoded key that may be used to encrypt and decrypt the primary storage.

The master key needed to decrypt a computing device that has been encrypted using full-disk encryption may be stored on the computing device, for example, in a secondary storage. The secondary storage may be a separate physical device from the primary storage, or may be the same physical device as the primary storage and separate from the rest of the primary storage by, for example partitioning of the primary storage. A table in the secondary storage may be used to store the master key. To prevent unauthorized access to the master key, and thus unauthorized decrypting of the primary storage of the computing device, the table in the secondary storage may also be encrypted using a key. The key used to encrypt the table, locking the table, may be based on input received from the user through the gesture interface of the computing device. The user may be asked to enter a gesture into the gesture interface, for example, drawing a shape using the interface, during the full-disk encryption process. The gesture input received from the user may be converted into a key for the table, and may be used to encrypt the table.

The gesture input received from the user may be used to generate a key to lock the table in any suitable manner. For example, the gesture interface may be divided into a 3 by 3 grid, with each node of the 9 nodes of the grid assigned (x,y) coordinates corresponding to their position in the grid. The gesture input to the gesture interface by the user may be converted to gesture data, which may be a string of bytes based on the nodes on the grid touched by the user while inputting the gesture, and the order in which they were touched. The gesture input may be converted into the gesture data in any other suitable manner such that the user does not need to repeat the motion for a gesture input exactly to result in the same gesture data. For example, if the gesture interface is divided into a 3 by 3 grid, the user may only need to have their motion touch the appropriate nodes of the grid, without regard for the exact positioning of the user's finger or stylus when touching each of the nodes. The gesture data, for example, the string of bytes, may be salted and hashed using any suitable hashing algorithm, such as, for example, scrypt, bcrypt, or MD5. This may result in a key that may be, for example, 256-bits in length. The key may be used to lock the table in which the master key is stored.

During subsequent usage of the computing device, the user may be required to enter the gesture corresponding to the gesture that was used to generate the key that was used to lock the table with the master key, so that the master key may be used to access the encrypted primary storage, for example, allowing the operating system to run. The user may enter gesture input into the gesture interface of the computing device, and the gesture input may be used to generate a key in the same manner as with the gesture input when the key was generated to initially lock the table. If the user inputs the substantially the same gesture as the gesture used to generate the key initially, then the same key can be generated again, for example, by the same conversion, salting, and hashing process. The key will then be able to unlock the table and allow access to the master key. If the user does not input the same gesture, for example, because the user is unauthorized and does not know the gesture that was input when the table was initially locked, the salting and hashing process may result in a different key that does not unlock the table with the master key. The unauthorized user may thus be prevented from accessing the master key, and be unable to decrypt the primary storage of the computing device. In this way, the gesture input used to initially lock the table with the master key may serve as a gesture-based password to unlock a computing device that uses full-disk encryption.

The gesture input that serves as the gesture-based password may not need to be stored on the computing device, and the key used to lock the table may also not need to be stored on the computing device. The same gesture input may always produce the same key after conversion to gesture data, salting, and hashing. The computing device may not need to compare any given gesture input to the gesture input that serves as the gesture-based password to determine if there is a match, nor have the key stored somewhere to be retrieved in the case of a match. A key may be produced each time there is gesture input from a user attempting to use the computing device, and if the gesture input is the gesture-based password, the key generated from the gesture input will successfully unlock the table. The process of key generation may be deterministic, with evidence of successful entry of a gesture-based password coming in the form of a key that successfully unlocks the table and allows access to the master key.

Gesture-based passwords may also be used when only a part of the storage of a computing device is encrypted. For example, a computing device may include a primary storage with two partitions, one encrypted and one unencrypted. All users of the computing device may have access to the unencrypted partition, which may include the operating system of the computing device, but gesture-based password may be needed to access the encrypted partition, which may include, for, example, sensitive data, or a second, secure operating system for the computing device.

The gesture input may be converted to a key in any suitable manner, so long as it is deterministic and repeatable. For example, instead of a 3 by 3 grid, the grid may be finer, for example, 5 by 5 or 10 by 10. Shape recognition may also be used, for example, to match gestures to drawings of symbols, such as letters, numbers, or other recognizable shapes and figures. For example, the gesture-based password may be a series of letters drawn on the gesture interface by the user. The gesture input from the user may be matched using any suitable technique to known letter shapes to determine which letters the user has drawn, generating a sequence of letters as gesture data. The sequence of letters may then be used to generate the key deterministically, because the matching process may result in a string of letters, regardless of whether the user drew the letter shapes exactly as they had drawn them previously. If the sequence of letters drawn by the user is correct, the sequence of matched letters may generate the same key initially used to lock the table, when the user first drew the sequence of letters during the encrypting of the primary storage. The key, being the same as the initial key, may thus unlock the table and allow access to the master key.

FIG. 1 shows an example system suitable for gesture-based password entry to unlock an encrypted device according to an implementation of the disclosed subject matter. A computing device 100 may include a gesture interface 110, a hasher 120, an encrypter/decrypter 150, a primary storage 140, and a secondary storage 130. The computing device 100 may be any suitable device, such as, for example, a computer 20 as described in FIG. 6. The computing device 100 may be a single computing device, or may include multiple connected computing devices, and may be, for example, a mobile computing device, such as a tablet, smartphone, or laptop, or any other computing device, such as a desktop, smart television, or media streaming device. The gesture interface 110 may be used to receive gesture input from a user of the computing device 100. The hasher 120 may be used to salt and hash gesture data created by the gesture input into the gesture interface 110 to create a table key. The encrypter/decrypter 150 may use a master key 137, which may be stored in table 135 in the second storage 130 to decrypt and access the primary storage 140, which may be protected by full-disk encryption. The table 135 may store the master key 137 in a secure manner, for example, using any suitable encryption, and may be unlocked by a table key created using gesture input to the gesture interface 110 that corresponds to a gesture-based password used to encrypt the table 135.

The gesture interface 110 may be any suitable interface of the computing device 100 for receiving gesture input from a user. For example, the gesture interface 110 may include the touchscreen on a smartphone, tablet, laptop, or desktop, or a touchpad on a laptop and may receive gesture input from a user's finger or a stylus. The gesture interface 110 may include visual cues to guide the gesture input from the user, for example, dividing the screen into separate sections so that the user may more readily repeat a specific gesture. Gestures made using the gesture interface 110 may be converted to gesture data in any suitable manner. For example, the gesture interface 110 may be divided into a 3 by 3 grid, and a gesture made on the gesture interface 110 may be converted into gesture data by converting the (x,y) coordinates for each section of the 3 by 3 grid touched by the user during the gesture into a string of bytes.

The hasher 120 may be any suitable hardware or software of the computing device 100 for salting and hashing gesture input to produce a key. For example, the hasher 120 may be cryptographic hardware connected to the gesture interface 110 and capable of accessing the secondary storage 130, or may be software capable of running on the computing device 100 even when the primary storage 140 is encrypted and is not accessible. The hasher 120 may receive gesture data based on the gesture input to the gesture interface 110, salt the gesture data, and hash the gesture data using a computationally expensive algorithm such as, for example, scrypt, creating a key. The resulting key may be the table key, which may be used to encrypt the table 135 when the primary storage 140 is initially encrypted, or upon a change to the gesture-based password. The table key may then be required to use most of the features of the computing device 100, such as, for example, the operating system, as the primary storage 140 may be encrypted and only accessible with the master key 137, which may be accessible only with the table key. To access the computing device 100, the user may need to enter the same gesture input into the gesture interface 110 that was entered when the table 135 was encrypted, reproducing the table key. The gesture input used to initially encrypt the table 135 may serve as the gesture-based password for the computing device 100. The hasher 120 may also store the salt, for example, in an unencrypted portion of the secondary storage 130, so that the salt may be used when generating future keys to ensure deterministic behavior of the hasher 120.

The encrypter/decrypter 150 may be any suitable hardware or software of the computing device 100 for performing cryptographic functions with the primary storage 140. For example, the encrypter/decrypter 150 may be cryptographic hardware capable of accessing the primary storage 140. The encrypter/decrypter 150 may be used to initially perform full-disk encryption on the computing device 100, generating the master key 137. The full-disk encryption may be performed on the primary storage 140, or any portion thereof, and may use any suitable encryption algorithm. After the encrypter/decrypter 150 has encrypted the primary storage 140, the primary storage 140 may only be accessible using the master key 137. To operate the computing device 100, the encrypter/decrypter 150 may need access to the master key 137, which may be stored in the encrypted table 135, as operating the computing device 100 may require decrypting and re-encrypting files stored in the primary storage 140, for example, to run the operating system of the computing device 100.

The secondary storage 130 may be any suitable storage for storing the table 135, and master key 137, in any suitable format. For example, the secondary storage 130 may be a separate storage device, such as a flash memory module of any suitable storage capacity, or may be a part of the primary storage 140, such as a separate partition. The secondary storage 130 may be secure. For example, the secondary storage 140 may be difficult to access using hardware that is not built-in to the computing device 100, to ensure that an unauthorized user may not have access to the table 135 and the master key 137 without knowing the gesture-based password to unencrypt the table 135.

Figure 2:
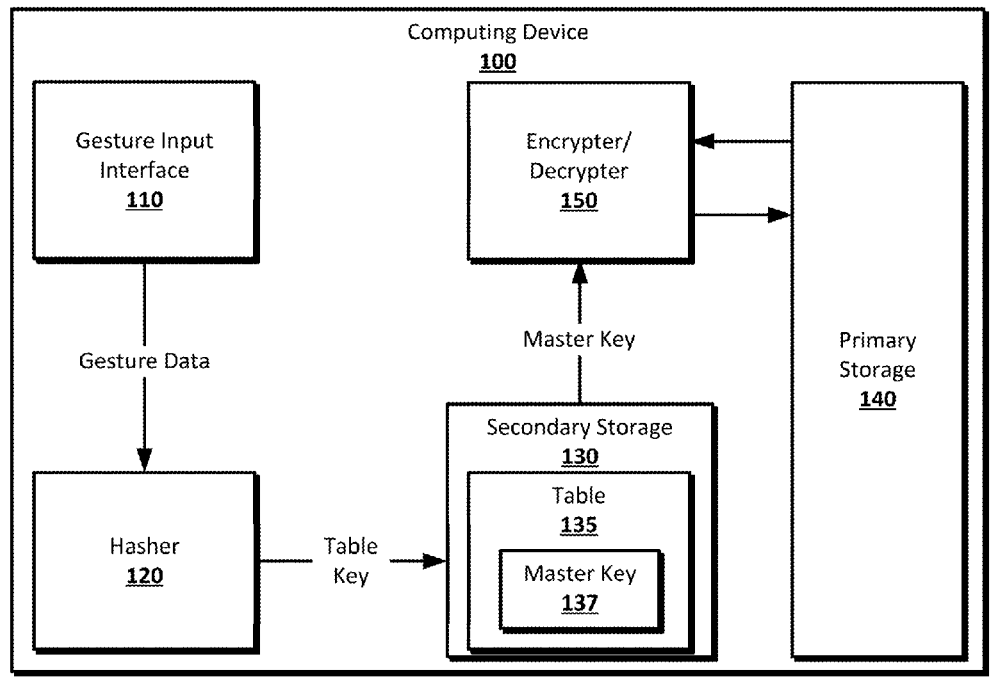
FIG. 2 shows an example arrangement for gesture-based password entry to unlock an encrypted device according to an implementation of the disclosed subject matter.

FIG. 2 shows an example arrangement for gesture-based password entry to unlock an encrypted device according to an implementation of the disclosed subject matter. A user may use the gesture input interface 110 to input a gesture into the computing device 100. The user may, for example, use their finger to draw a figure on a touchscreen of the computing device 100. The gesture input may be converted to gesture data in any suitable manner, for example, converting gesture input on a grid to a string of bytes based on (x,y) coordinates or matching symbols drawn in the gesture input. The gesture interface 110 may display a lock screen or other password entry screen requesting that the user enter a gesture input. For example, the user may have selected to use full-disk encryption on a currently unencrypted computing device 100, and the gesture interface 110 may display a screen requesting the user input a gesture to establish a gesture-based password that can be used to later unencrypt the primary storage 140 of the computing device by allowing access to the master key 137. The user may be attempting to use the computing device 100 after the implementing full-disk encryption, and the gesture interface may display a screen requesting the user input the gesture input that serves as the gesture-based password.

The hasher 120 may receive the gesture data from the gesture interface 110. Any gesture data from gesture input made while a screen requesting a gesture-based password is displayed may be sent to the hasher 120. The hasher 120 may salt and hash the gesture data to produce a key, which may be the table key. The table key may be the key that is capable of decrypting the table 135. For example, if the primary storage 140 is being encrypted initially, the gesture data may be used by the hasher 120 to generate the table key that may be used to encrypt the table 135. If the primary storage 140 is already encrypted, the hasher 120 may generate a key from the gesture data, which may be the table key when the gesture input used to generate the gesture data is the gesture-based password, otherwise the generated key may be an invalid key. The hasher 120 may operate deterministically, such that the same gesture data always results in the same key. The key may be, for example, a 256-bit key.

The table key may be used to encrypt or decrypt the table 135 in the secondary storage 130. For example, the hasher 120, or the encrypter/decrypter 150, may encrypt the table 135 after the master key 137 has been stored in the table 135 during the initial encryption of the primary storage 140. Subsequently, the table key may be used to decrypt the table 135, allowing access to the master key 137. Any attempt to decrypt the table 135 using a key that is not the table key may fail, preventing access to the master key 137. For example, if the gesture input was not the gesture-based password, the gesture data may be different from the gesture data for the gesture based password. This may result in the hasher 120 using the gesture data to generate a key that is not the table key, and the user who entered the gesture input may be unable to access the primary storage 140 of the computing device, which may, for example, prevent use of the operating system of the computing device 100.

The encrypter/decrypter 150 may be able to access the master key 137 once the table 135 has been decrypted with the table key. The encrypter/decrypter 150 may use the master key 137 to decrypt and re-encrypt the encrypted data in the primary storage 140, allowing the computing device 100 to operate. For example, to load the operating system of the computing device 100, the encrypter/decrypter 150 may need to use the master key 137 to decrypt files specified by the boot-loader of the computing device 100 so that the files may be executed on the processor of the computing device 100. When data in the primary storage 140 is changed, or new data is added, during the use of the computing device 100, the encrypter/decrypter 150 may use the master key 137 to ensure that the new or changed data is stored with the appropriate encryption, to ensure that the data on the primary storage 140 remains encrypted.

Figure 3:
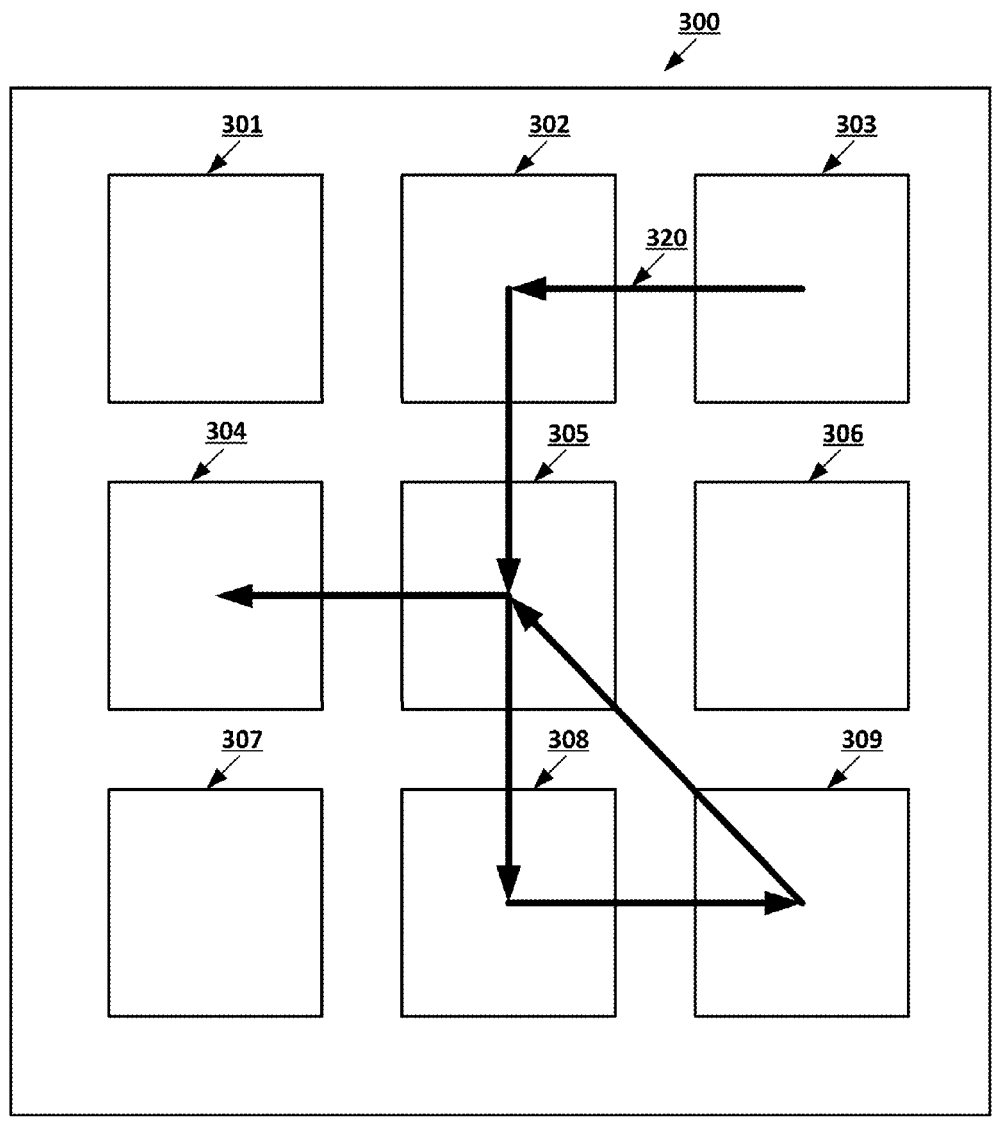
FIG. 3 shows an example visualization for gesture-based password entry to unlock an encrypted device according to an implementation of the disclosed subject matter.

FIG. 3 shows an example visualization for gesture-based password entry to unlock an encrypted device according to an implementation of the disclosed subject matter. A gesture interface display 300 may be displayed on the gesture interface 110, which may be, for example, a touchscreen, of the computing device 100. The gesture interface display 300 may be divided into a 3 by 3 grid of nodes, for example, the nodes 301, 302, 303, 304, 305, 306, 307, 308, and 309. A user may use the gesture interface 100 to input a gesture 320, for example, moving a finger in a continuous motion from node 303 to node 302 to node 305 to node 308 to node 309 to node 305 to node 304.

The gesture 320 may be converted by, for example, the gesture interface 110, into gesture data. For example, each of the nodes 301, 302, 303, 304, 305, 306, 307, 308, and 309 may be assigned a value based on the node's (x,y) position in the 3 by 3 grid. If the node 301 is (0,0) and the node 309 is (2,2), the gesture 320 may be converted to gesture data 20101112221101. The gesture data may be salted, for example, with the string "fg392n" hashed, for example, using MD5 hashing, to a key a4fcdcbd83d08f3272dff7d31528f07c. The salt string may be stored, for example, in the secondary storage 130.

The key a4fcdcbd83d08f3272dff7d31528f07c may be used as the table key to encrypt the table 135, for example, if the primary storage 140 is being initially encrypted and the master key 137 has been stored in the table 135, or if the gesture-based password is being changed by a user who already has entered the current gesture-based password. The gesture 320 may be the gesture input that serves as the gesture-based password for the computing device 100, and may be necessary to unencrypt the primary storage 140 on subsequent usage of the computing device 100. When a user attempts to use the computing device 100, the gesture interface 110 may show the gesture interface display 300. The user may enter a gesture using the gesture interface. If the user inputs the gesture 320, moving in a continuous motion from node 303 to node 302 to node 305 to node 308 to node 309 to node 305 to node 304, the gesture interface 310 may convert the input to the gesture data 20101112221101, which may be salted with the stored salt string "fg392n", and hashed using MD5 hashing to the key a4fcdcbd83d08f3272dff7d31528f07c, which may be the table key that may unencrypt the table 135, allowing access to the master key 137 and decryption of the primary storage 140.

If the user inputs a gesture that is not the gesture 320, for example, because the user does not know that the gesture 320 is the gesture-based password, the hasher 120 may generate a key that is not the table key. For example, if the user moves a finger in a continuous motion from node 306 to node 302 to node 305 to node 308 to node 309 to node 305 to node 307, the gesture input may be converted to the gesture data 21101112221102. The gesture data may be salted with the salt string "fg392n" from the secondary storage 130, and hashed using MD5 hashing to the key 75c2d36e9dc090ddde9fb2067efef3b6. The key may not match the table key of a4fcdcbd83d08f3272dff7d31528f07c, and may not be able to unencrypt the table 135 and allow access to the master key 137. In this way, gesture input that is not the gesture-based password may not be used to access the computing device 100 when full-disk encryption is in use, without requiring that the gesture-based password or the table key be stored in non-volatile memory on the computing device 100.

Figure 4:
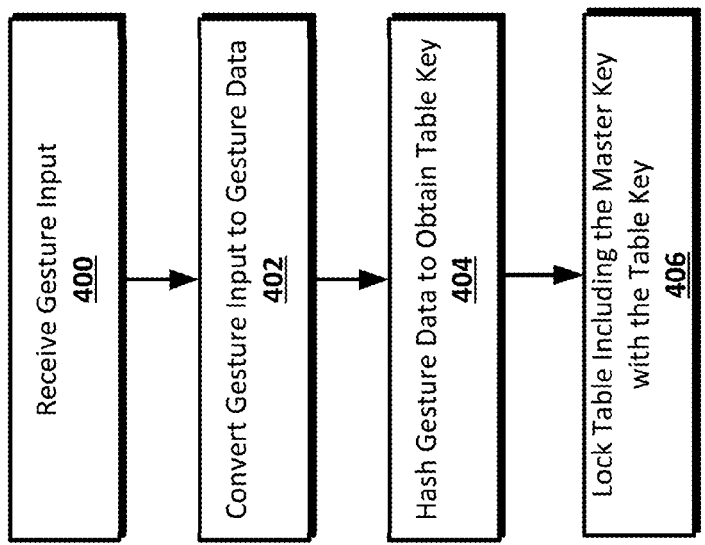
FIG. 4 shows an example of a process for gesture-based password entry to unlock an encrypted device according to an implementation of the disclosed subject matter.

FIG. 4 shows an example of a process for gesture-based password entry to unlock an encrypted device according to an implementation of the disclosed subject matter. At 400, a gesture input may be received. For example, the computing device 100 may receive gesture input from a user through the gesture interface 110. The gesture interface 100 may display a screen requesting the gesture input, for example, to establish a gesture-based password for the computing device 100 during initial encryption of the primary storage 140 or during a change of a previously established gesture-based password. The screen may include guides for the gesture input, such as, for example, nodes in a 3 by 3 grid as in the gesture interface display 300. The gesture input may server as the gesture-based password for the computing device 100.

At 402, the gesture input may be converted into gesture data. For example, the gesture interface 110 may convert the gesture input, such as the gesture 320, into gesture data in any suitable manner. The gesture input may be converted into gesture data by, for example, using the (x,y) coordinates of the nodes of the gesture interface display 300 that were touched during the continuous motion of the gesture input.

At 404, the gesture data may be hashed to obtain a table key. The gesture data converted from the gesture input may be hashed by, for example, hasher 120, using any suitable hashing algorithm, to generate a table key. The gesture data may also be salted before being hashed, using a generated salt string that may then be stored, for example, in the secondary storage 130. The hashing of the gesture data may be deterministic, such that the same gesture data always results in generation of the same key after salting and hashing.

At 406, a table including a master key may be locked with the table key. For example, the table key generated by the hasher 120 may be used to encrypt the table 135 in the storage 130, including the master key 137. The master key 137 may have been used to encrypt the primary storage 140 and stored in the secondary storage 130 by, for example, the encrypter/decrypter 150. The table key may be discarded, for example, removed from any volatile and non-volatile memory of the computing device 100, after the table 135 is encrypted, locking up the master key 137.

Figure 5:
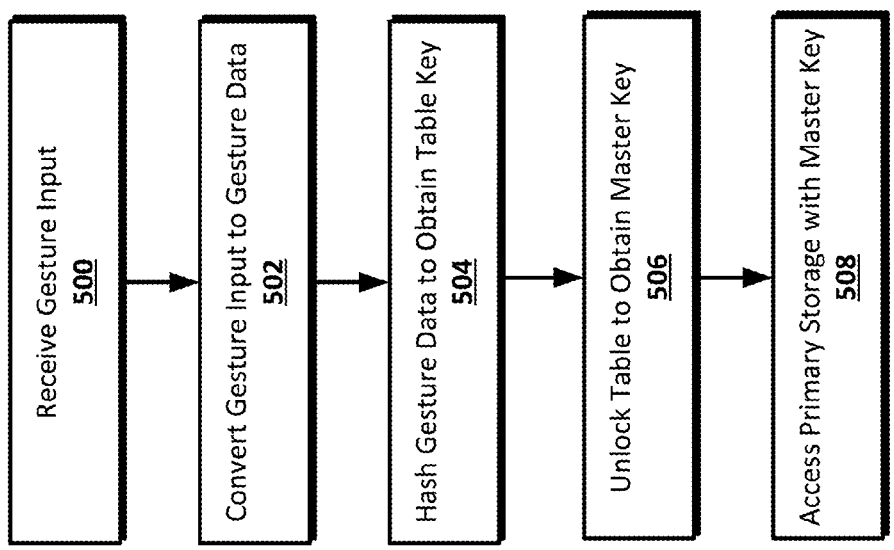
FIG. 5 shows an example of a process for gesture-based password entry to unlock an encrypted device according to an implementation of the disclosed subject matter.

FIG. 5 shows an example of a process for gesture-based password entry to unlock an encrypted device according to an implementation of the disclosed subject matter. At 500, a gesture input may be received. For example, the computing device 100 may receive gesture input from a user through the gesture interface 110. The gesture interface 100 may display a screen requesting the gesture input, for example, to access the computing device 100 with an encrypted primary storage 140. The screen may include guides for the gesture input, such as, for example, nodes in a 3 by 3 grid as in the gesture interface display 300.

At 502, the gesture input may be converted into gesture data. For example, the gesture interface 110 may convert the gesture input, such as the gesture 320, into gesture data in any suitable manner. The gesture input may be converted into gesture data by, for example, using the (x,y) coordinates of the nodes of the gesture interface display 300 that were touched during the continuous motion of the gesture input.

At 504, the gesture data may be hashed to obtain a table key. The gesture data converted from the gesture input may be hashed by, for example, hasher 120, using any suitable hashing algorithm, to generate a table key. The gesture data may also be salted before being hashed, using a salt string that may have been stored, for example, in the secondary storage 130, when the table key used to encrypt the table 135 was initially generated. The hashing of the gesture data may be deterministic, such that the same gesture data always results in generation of the same key after salting and hashing. If the gesture input received using the gesture interface 110 results in the same gesture data as the gesture input that was used to initially generate the table key, the key generated from the gesture input may be the table key. Otherwise, the key may be an invalid key.

At 506, a table may be unlocked to obtain a master key. For example, the table key generated using the gesture data from the received gesture input may be used to decrypt, or unlock, the table 135 in the secondary storage 130. Decrypting the table 135 with the table key may allow access to the master key 137 by, for example, the encrypter/decrypter 150. If the key generated using the gesture data from the received gesture input is not the table key, for example, because the gesture input was not the gesture-based password and resulted in the generation of an invalid key, the key may not be able to decrypt the table 135.

At 508, the master key may be used to access primary storage. For example, the master key 137 may be accessible after the table 135 has been decrypted using the table key. The master key 137 may have been used to encrypt the primary storage 140. The encrypter/decrypter 150 may use the master key to access the primary storage 140, allowing the computing device 100 to operate, for example, running an operating system stored on the encrypted primary storage 140.

Figure 6:
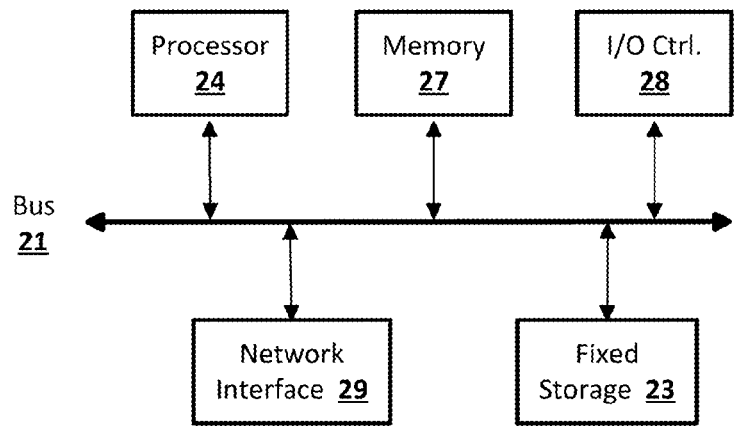
FIG. 6 shows a computer according to an embodiment of the disclosed subject matter.

Embodiments of the presently disclosed subject matter may be implemented in and used with a variety of component and network architectures. FIG. 6 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 7.

Many other devices or components (not shown) may be connected in a similar manner, such as document scanners, digital cameras, auxiliary, supplemental, or backup systems, or the like. Conversely, all of the components shown in FIG. 6 need not be present to practice the present disclosure. The components can be interconnected in different ways from that shown. The operation of a computer such as that shown in FIG. 8 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 7:
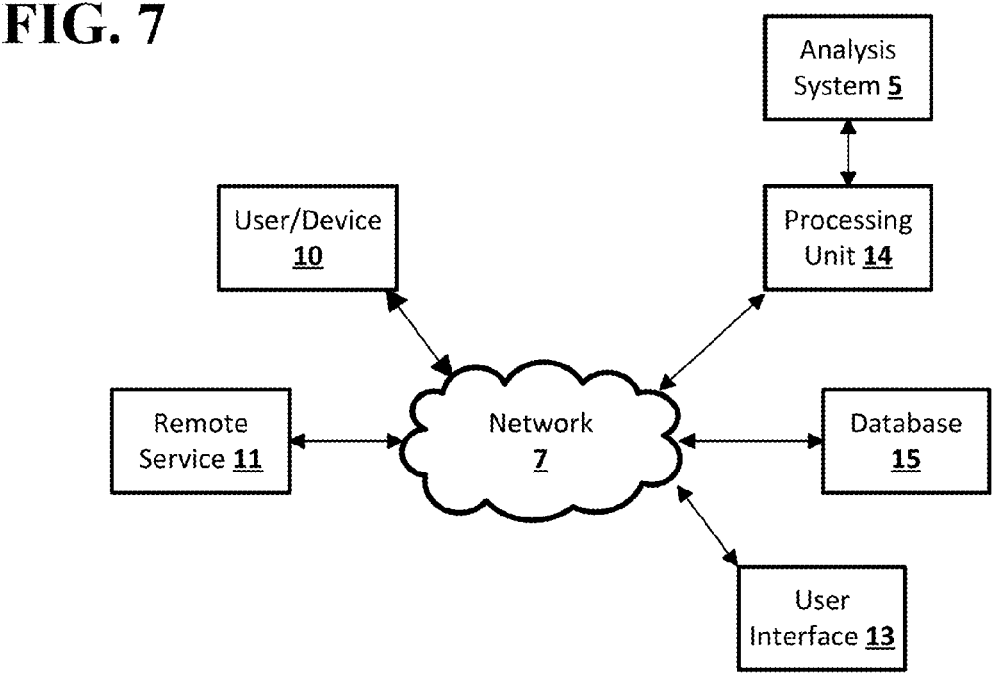
FIG. 7 shows a network configuration according to an embodiment of the disclosed subject matter.

FIG. 7 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method for gesture-based password entry, the method comprising:
   receiving a gesture input to a device, wherein the gesture input is a continuous motion input from a user to a gesture interface on the device;
   converting the gesture input to gesture data, wherein the gesture data is a byte string;
   hashing the byte string using a hashing algorithm to obtain a table key;
   encrypting a table comprising a master key using the table key, wherein the master key comprises a key for decrypting a primary storage of the device that is at least partially encrypted, and wherein the table is stored in a secondary storage of the device;
   discarding the table key after encrypting the table, wherein no copy of the table key is stored in non-volatile memory on the device after encrypting the table;
   receiving a second gesture input, wherein the second gesture input is continuous motion input from a user to the gesture interface on the device;
   converting the second gesture input to second gesture data, wherein the second gesture data is a second byte string;
   hashing the second byte string using the hashing algorithm to obtain a second table key identical to the table key; and
   decrypting the table comprising the master key using the second table key when the second table key is identical to the table key.

2. The computer-implemented method of claim 1, further comprising:
   before hashing the byte string, salting the byte string with a salt string; and
   before hashing the second byte string, salting the second byte string with the salt string.

3. The computer-implemented method of claim 1, further comprising accessing with the master key the primary storage that is at least partially encrypted.

4. The computer-implemented method of claim 1, wherein converting the gesture input to the gesture data comprises converting at least one grid coordinate touched during the gesture input to the byte string.

5. The computer-implemented method of claim 1, wherein converting the gesture input to the gesture data comprises matching at least one symbol drawn in the gesture input and generating a string comprising the at least one matched symbol.

6. The computer-implemented method of claim 1, wherein the second gesture data is the same as the gesture data.

7. A computer-implemented system for gesture-based password entry comprising:
   a primary storage, wherein the primary storage is encrypted using a master key;
   a secondary storage comprising a table, the table comprising the master key, wherein the table is encrypted with a table key, wherein the primary storage and the secondary storage are part of a single storage device or the primary storage is on a first storage device and the secondary storage is part of a second storage device;
   a hasher to receive a first byte string generated from a continuous motion of a gesture input to a device, hash the first byte string to generate the table key, receive a second byte string generated from a continuous motion of a second gesture input to the device and hash the second byte string to generate a second table key, wherein the second table key is identical to the table key when the first byte string is identical to the second byte string;

an encrypter/decrypter to encrypt the table with the table key and discard the table key after the table is encrypted wherein no copy of the table key is stored in non-volatile memory of the device after encrypting the table, decrypt the table using the second table key when the second table key is identical to the table key to retrieve the master key, and encrypt and decrypt the primary storage using the master key from the table after the table is decrypted; and a gesture interface device to receive the first gesture input and the second gesture input, convert the first gesture input to the first byte string, convert the second gesture input to the second byte string, and send the first byte string and the second byte string to the hasher.

8. The computer-implemented system of claim 7, wherein the hasher is further adapted to salt the first byte string before hashing the first byte string, and to store the salt in the secondary storage.

9. The computer-implemented system of claim 7, wherein the gesture interface is further adapted to convert the first gesture input to the first byte string by converting at least one grid coordinate touched during the first gesture input to a byte string.

10. The computer-implemented system of claim 7, wherein the gesture interface is further adapted to convert the gesture input to gesture data by matching at least one symbol drawn in the gesture input and generating a string comprising the at least one matched symbol.

11. A system comprising: one or more computers and one or more storage devices storing instructions which are operable, when executed by the one or more computers, to cause the one or more computers to perform operations comprising:

receiving a gesture input to a device, wherein the gesture input is a continuous motion input from a user to a gesture interface on the device;

converting the gesture input to gesture data, wherein the gesture data is a byte string;

hashing the byte string using a hashing algorithm to obtain a table key;

encrypting a table comprising a master key using the table key, wherein the master key comprises a key for decrypting a primary storage of the device that is at least partially encrypted, and wherein the table is stored in a secondary storage of the device;

discarding the table key after encrypting the table, wherein no copy of the table key is stored in non-volatile memory on the device after encrypting the table;

receiving a second gesture input, wherein the second gesture input is continuous motion input from a user to the gesture interface on the device;

converting the second gesture input to second gesture data, wherein the second gesture data is a second byte string;

hashing the second byte string using the hashing algorithm to obtain a second table key identical to the table key; and decrypting the table comprising the master key using the second table key when the second table key is identical to the table key.

* * * * *